(12) United States Patent
Davis et al.

(10) Patent No.: US 10,430,610 B2
(45) Date of Patent: Oct. 1, 2019

(54) ADAPTIVE DATA OBFUSCATION

(71) Applicant: International Business Machines Corporation, Armonk, NY (US)

(72) Inventors: Gregory A. Davis, Mazerolle Settlement (CA); Jason D. Keirstead, Fredericton (CA); Hong Yen Ong, Singapore (SG); Hui Lam Ong, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 15/199,176

(22) Filed: Jun. 30, 2016

(65) Prior Publication Data
US 2018/0004976 A1    Jan. 4, 2018

(51) Int. Cl.
*G06F 21/62* (2013.01)

(52) U.S. Cl.
CPC ............................... *G06F 21/6254* (2013.01)

(58) Field of Classification Search
None
See application file for complete search history.

(56) References Cited

U.S. PATENT DOCUMENTS

| | | | |
|---|---|---|---|
| 6,009,424 A * | 12/1999 | Lepage | G06F 16/90344 |
| 7,599,930 B1 * | 10/2009 | Burns | G06F 16/3338 |
| 8,649,552 B2 | 2/2014 | Balakrishnan et al. | |
| 8,811,612 B2 | 8/2014 | Gerraty | |
| 8,997,248 B1 * | 3/2015 | McKay | H04L 63/0428 |
| | | | 726/27 |
| 9,269,028 B2 * | 2/2016 | Kurzer | G06F 16/90344 |
| 9,430,451 B1 * | 8/2016 | Kleshchevich | G06F 17/218 |
| 9,442,980 B1 * | 9/2016 | Trepetin | G06F 21/6254 |
| 9,928,377 B2 * | 3/2018 | Narayanaswamy | G06F 21/6218 |
| 2008/0069340 A1 * | 3/2008 | Vaughn | H04L 9/06 |
| | | | 380/28 |
| 2009/0132419 A1 | 5/2009 | Grammer et al. | |

(Continued)

FOREIGN PATENT DOCUMENTS

| | | | |
|---|---|---|---|
| WO | 2015073260 A1 | 5/2015 | |
| WO | 2015073349 A1 | 5/2015 | |

OTHER PUBLICATIONS

Cerutti et al., "Obfuscation of Semantic Data: Restricting the Spread of Sensitive Information," DL 2014, 27th International Workshop on Description Logics, 13 pages, vol. 1193. http://ceur-ws.org/Vol-1193/paper_27.pdf.

*Primary Examiner* — Trang T Doan
(74) *Attorney, Agent, or Firm* — Kelsey M. Skodje

(57) ABSTRACT

The method for obfuscating a string includes selecting, by a processor, a first string of a first portion of input plain text that does not match a predefined text signature from a set of two or more text signatures. In addition, the method may include identifying, by the processor, a historical string that is similar to the first string from a set of two or more historical strings stored. Further, the method may include generating a first text signature, by the processor, by updating a text signature in the set of two or more text signatures that matches the identified historical string. The first text signature defines a pattern that matches the first string and the identified historical string. The first text signature, by the processor, may be saved to the set of text signatures in the memory.

20 Claims, 4 Drawing Sheets

(56) References Cited

U.S. PATENT DOCUMENTS

| | | | |
|---|---|---|---|
| 2010/0115260 A1 | 5/2010 | Venkatesan et al. | |
| 2013/0246337 A1* | 9/2013 | Ahuja | G06F 16/374 |
| | | | 707/601 |
| 2013/0268839 A1* | 10/2013 | Lefebvre | G06Q 10/107 |
| | | | 715/234 |
| 2014/0201526 A1 | 7/2014 | Burgess | |
| 2015/0180839 A1 | 6/2015 | Moffat | |
| 2015/0186502 A1* | 7/2015 | Kassa | G06F 16/90344 |
| | | | 707/723 |
| 2015/0304337 A1* | 10/2015 | Nguyen-Tuong | G06F 21/51 |
| | | | 726/1 |
| 2017/0351847 A1* | 12/2017 | Zvenigorodsky | G06F 21/14 |

\* cited by examiner

Input plain text:

Input plain text with confidential information obfuscated:

ADAPTIVE DATA OBFUSCATION

BACKGROUND

The present disclosure relates to obfuscating strings of plain text and, more specifically, to automatically determining a text signature for use in recognizing a string of plain text that requires obfuscation.

Today, there are numerous applications that require large amounts of data, which often must be shared amongst multiple parties. Frequently, portions of this data are considered confidential and must be hidden from certain users, while remaining available to others. At present, privacy is achieved by data obfuscation methods that require predefined text signatures for use in recognizing lists of words and numbers expressed in plain text.

SUMMARY

Various embodiments are directed to a computer-implemented method for obfuscating a string. The method may include selecting, by a processor, a first string of a first portion of input plain text that does not match a predefined text signature from a set of two or more text signatures. The set of two or more text signatures may be stored in a memory. In addition, the method may include identifying, by the processor, a historical string that is similar to the first string from a set of two or more historical strings stored. Further, the method may include generating a first text signature, by the processor, by updating a text signature in the set of two or more text signatures that matches the identified historical string. The first text signature defines a pattern that matches the first string and the identified historical string. The first text signature, by the processor, may be saved to the set of text signatures in the memory.

Various alternative embodiments are directed to a system and a computer program product for obfuscating a string.

DETAILED DESCRIPTION

Consistent with embodiments of the present disclosure, it is recognized that predefined text signatures may not always be up to date. Strings that require obfuscation may be presented to a system performing obfuscation in a new format when, for example, a new source of plain text is added or an existing source of plain text changes the format of a string. Strings that require obfuscation may be presented in a new format to a system performing obfuscation without advance notice or without sufficient lead time for a new text signature to be manually developed. Advantageously, aspects of the present disclosure provide data obfuscation techniques that may not require predefined text signatures for use in recognizing lists of words and numbers expressed in plain text that require obfuscation. Furthermore, aspects of the present disclosure may advantageously employ machine learning to generate a text signature that can be used to recognize a string that requires obfuscation which is presented in a format not recognized by a known predefined text signature.

It is to be understood that the aforementioned advantages are example advantages and should not be construed as limiting. Embodiments of the present disclosure can contain all, some, or none of the aforementioned advantages while remaining within the spirit and scope of the present disclosure.

An embodiment is directed to selecting, by a computer processor, a string in a portion of input plain text that does not match a predefined text signature. The computer processor can be used to find a historical string that is similar to the selected string. Further, a predefined text signature that matches the historical string can be updated to define a pattern that matches the selected string as well, e.g., a new text signature. When a predefined text signature is updated, its corresponding predefined obfuscation key can also be updated. The selected string may be obfuscated. Additionally, it can optionally be determined by the processor whether there is a string commonly associated with the selected string. If so, a condition can be generated stating that a future string of input plain text matching either a predefined or updated text signature should be considered confidential only if found with the commonly associated string.

Figure 1:
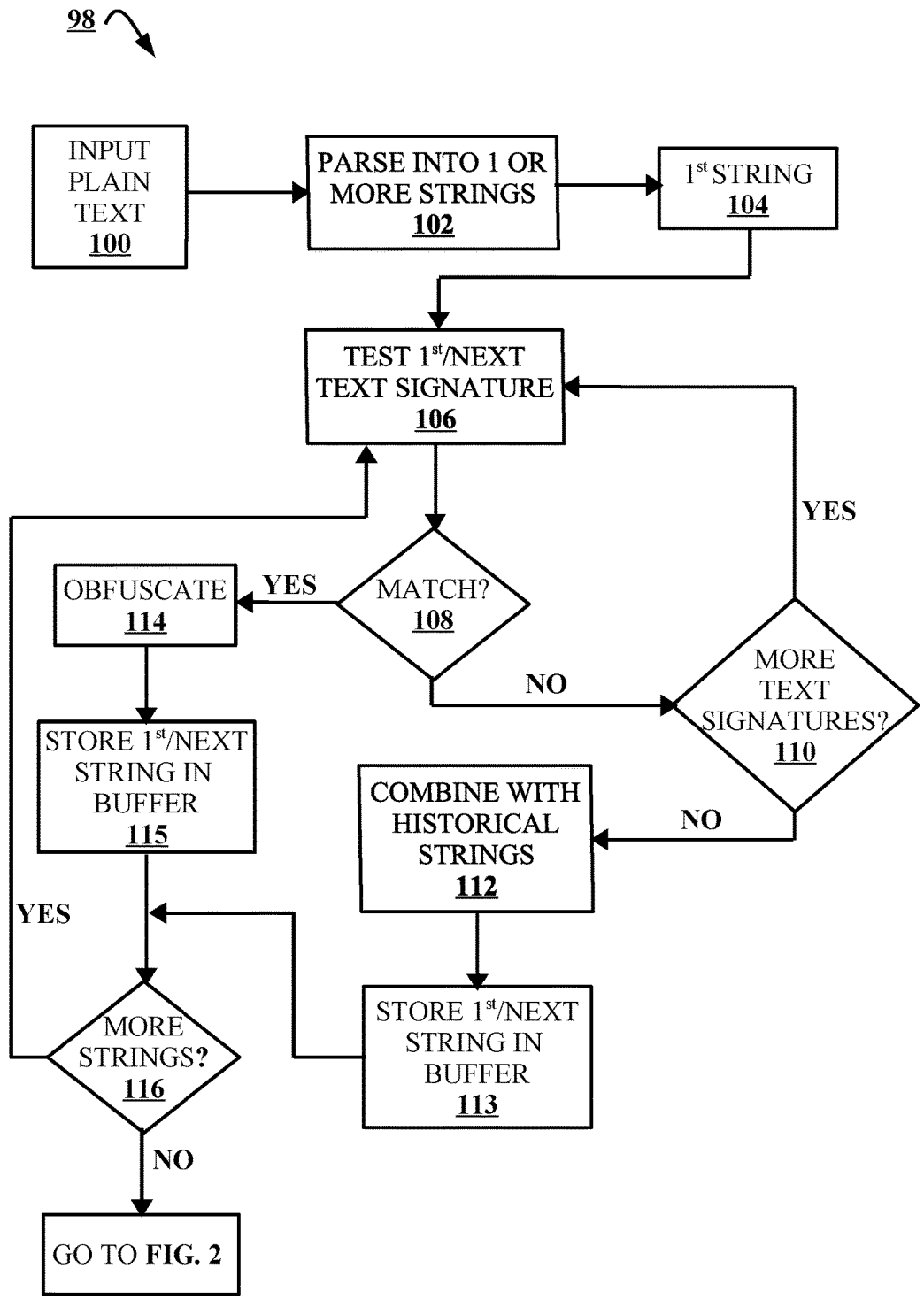
FIGS. 1 and 2 illustrate flowcharts that show a process for data obfuscation of confidential strings using text signatures according to various embodiments.
Figure 2:
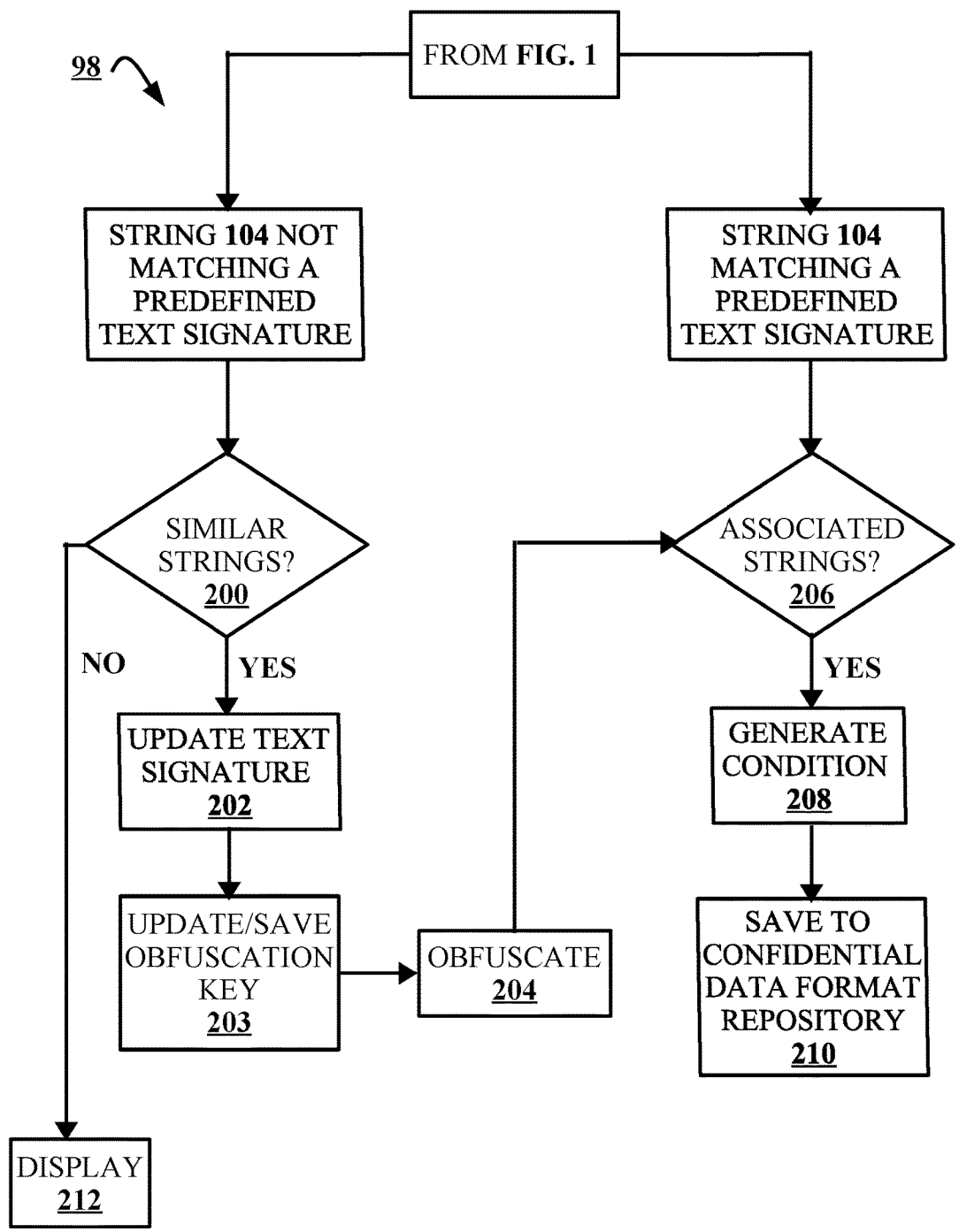

FIGS. 1 and 2 illustrate flowcharts that show a process, performed by a computer system, for data obfuscation of confidential strings using text signatures, according to various embodiments. In some embodiments, one or more operations may be performed by a user or by a computer system in response to user input. In some embodiments, a string that requires data obfuscation can be recognized by determining that it conforms to a particular text signature. One example of a text signature is a regular expression. A regular expression is a sequence of characters used to define a search pattern. An example of a simple regular expression is [bc]at, which matches only "bat" and "cat". If one wanted to obfuscate the words "bat" and "cat" from a document, [bc]at could be used as a predefined text signature designed to locate those words. The use of predefined text signatures requires that the structure of each string that requires data obfuscation be known in advance and manual development of a text signature for each string requiring obfuscation. However, the structure of a string requiring obfuscation may change without advance notice or before a text signature can be manually developed.

Referring to FIG. 1, a process 98 for data obfuscation can begin in operation 102 by parsing input plain text 100 into one or more strings. The input plain text may be of unstructured or structured information in a digital format readable by a computer system. A portion of input plain text can be one or more documents. Further, one document could contain more than one portion of input plain text. An electronic document may contain one or more input plain text portions. The document may include public information that may be shared and private information that is deemed confidential and which should only be shared with those having appropriate permission. Examples of confidential input plain text include medical information, financial information, or any other information that a person or a business considers confidential or information which it is not legally permissible to share. With respect to medical information, confidential strings in this document could be patient names or insurance ID numbers.

Figure 3:
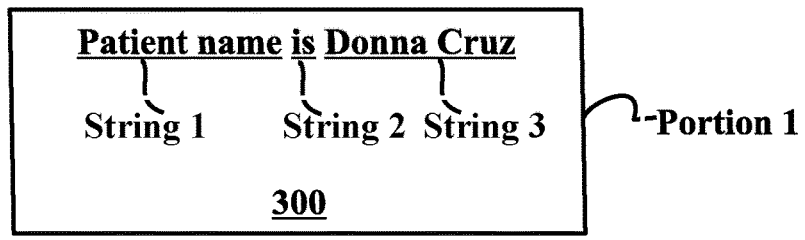
FIG. 3 illustrates a diagram showing possible examples of input plain text.
Figure 3:
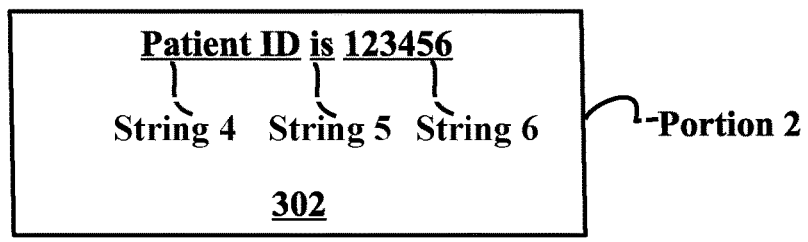
Figure 3:
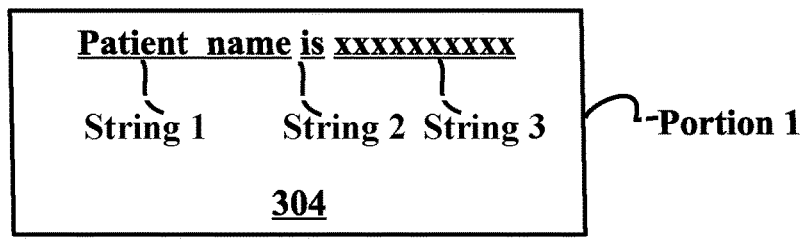
Figure 3:
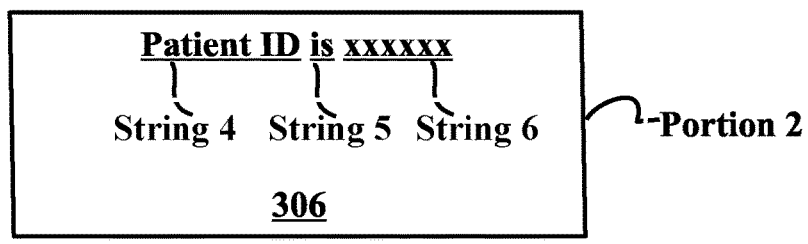

FIG. 3 shows a first example 300 of an input plain text portion and a second example 302 of an input plain text portion. As may be seen in the figure, the first input plain text portion 300 includes string 1, string 2, and string 3. Similarly, the second input plain text portion 302 includes string 4, string 5, and string 6. Depicted in FIG. 1, operation 102 parses an input plain text portion 100 into one or more strings, e.g., string 1, string 2, and string 3. In some embodiments, the operation 102 may recognize delimiters that mark boundaries between strings in the input plain text. Additionally, the operation 102 could break the input plain text into fixed-length strings.

The term "text" in the phrases "input plain text," "text signature," and the term "string," as used herein, may refer to numerical data, text data, or both numerical and text data.

Figure 4:
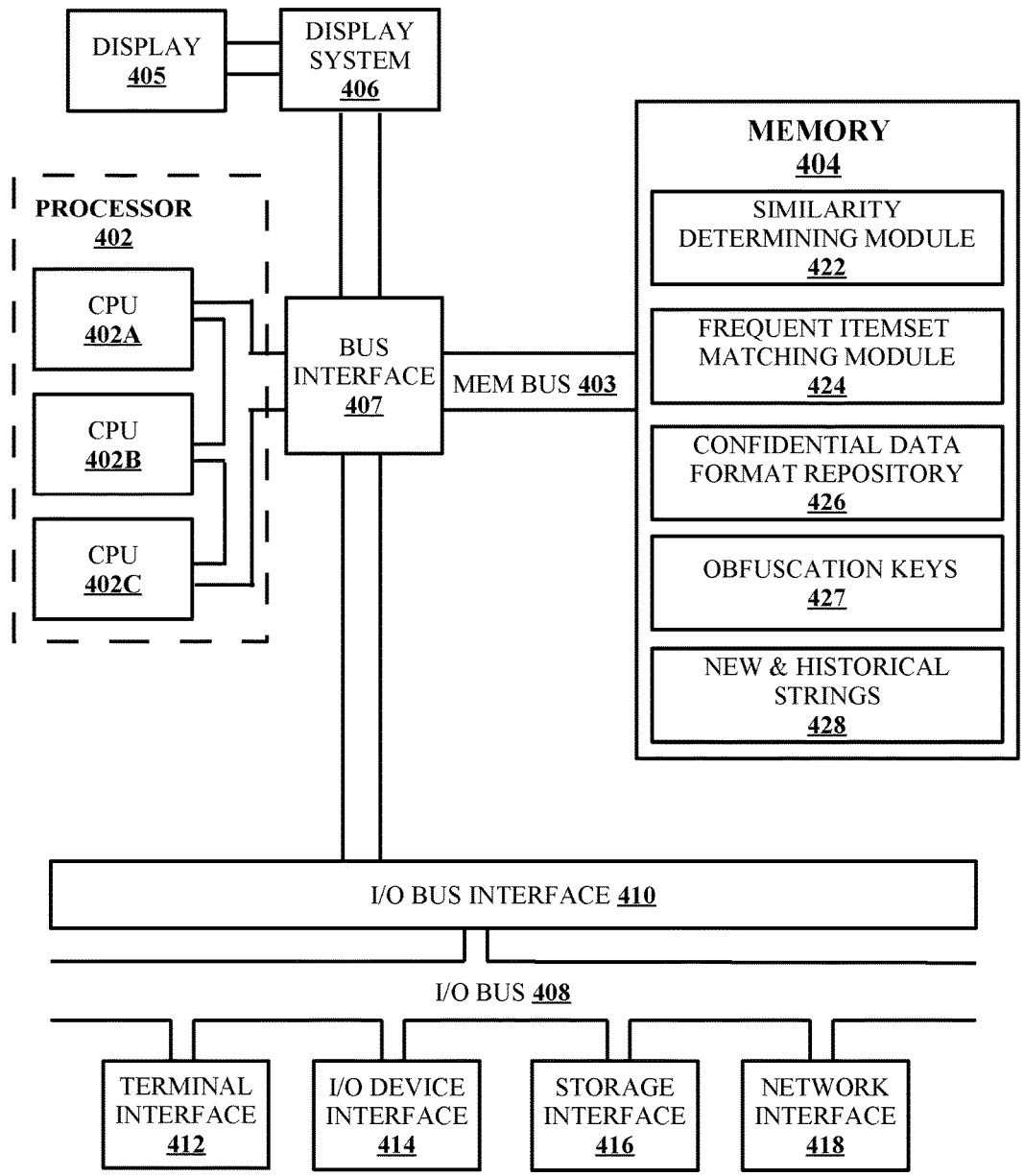
FIG. 4 depicts a computer system according to embodiments of the present disclosure.

Referring again to FIG. 1, after the strings of plain text have been parsed, a first (or next) string 104 can be checked in operation 106 for confidential information by comparing it to one or more predefined text signatures from a set of predefined text signatures. The predefined text signatures may correspond to types of strings that are known to be confidential. The set of predefined text signatures may be defined by a user, a business, or an institution, e.g. a bank or a hospital. In addition, in some embodiments, there may also be predefined text signatures in the set that correspond to examples of confidential data patterns provided by a third party, which is typically available by subscription. A confidential data format repository may contain common and specific samples of confidential data formats and patterns. The set of predefined text signatures may be stored in a computer memory, e.g., a confidential data format repository 426 (FIG. 4). Predefined text signatures may also be retrieved from a remote server, in some embodiments.

In operation 108, it is determined whether the selected first/next string matches one of the predefined text signatures stored in the set of predefined text signatures in the confidential data format repository 426. If a text signature does not match the selected string 104, it is determined in operation 110 whether there are additional predefined text signatures to evaluate the first/next text signature against. If there are additional predefined text signatures in the set, the method advances to operation 106, where the first/next string is tested against a next predefined text signature. If all of the predefined text signatures have been compared to the first/next text string 104 and if none of the predefined text signatures match, the string 104 is combined with a set of historical strings in operation 112. A string that reaches the operation 112 may not be confidential or it may be string that should be treated as confidential, but the string is in an unrecognized format. In some embodiments, if none of the predefined text signatures match the string 104, it may mean that the string 104 is not to be treated as confidential. In other embodiments, if none of the predefined text signatures match the string 104, it may mean that the string 104 is to be treated as confidential and requires obfuscation but does not exactly match any of the predefined text signatures. The process 98 may advance from operation 112 to operation 113, where a string 104 not matching a predefined signature is temporarily stored in a buffer. After the string 104 has been stored in a buffer, it is determined whether the input plain text includes more strings in operation 116.

If the selected string 104 is found to match a text signature in operation 108, the string is obfuscated with a predefined obfuscation key that corresponds to the matching text signature in operation 114. The predefined obfuscation keys can be stored in a set of obfuscation keys 427 in a computer memory 404 (FIG. 4). In some embodiments, predefined obfuscation keys may be retrieved from a remote server. Any suitable obfuscation key may be used. For example, obfuscated characters may be replaced with X's. As a second example, obfuscated characters may be replaced with a value that preserves a property of string. For instance, a numeric character may be replaced with another numeric character such that a checksum calculation still evaluates the string as a valid value. In an example of obfuscation, illustrated in FIG. 3, the strings of input text determined to be confidential (e.g. string 3 in portion 1 and string 6 in portion 2) and thus obfuscated are a patient's name and ID number in obfuscated strings 304 and 306. The string 104 is temporarily stored in a buffer in operation 115. After the string 104 has been obfuscated and saved in a buffer, it is determined whether the input plain text includes more strings in operation 116.

In operation 116, it is determined whether there are more strings. As shown in FIG. 3, a portion of input plain text may include multiple strings. If there is one or more strings 104 from the input plain text 100 remaining to be evaluated, the process 98 returns to operation 106 where a next string 104 is tested. When there are no more strings to be tested, the process 98 continues on to operation 200 for strings 104 that did not match a predefined text signature and operation 206 for strings 104 that did match a predefined text signature, as illustrated in FIG. 2.

FIG. 2 illustrates a flowchart that continues from FIG. 1 and depicts operations in one example of an adaptive data obfuscation process 98. In operation 200, a similarity algorithm is used to determine whether a selected string 104 that did not match a predefined text signature is similar to a historical string. The similarity algorithm may determine how similar the string 104 is to historical strings in the set of historical strings. The historical strings may be stored in a memory (either a local memory or remote memory, e.g. a memory on a server) as indicated by reference number 428 and designated New and Historical Strings (FIG. 4). Recall that the string 104 was combined with the set of historical strings in operation 112. In this regard, note that a similarity algorithm may determine how similar the string 104 is to any historical string other than the particular string 104 itself. Similarity algorithms used in this operation 200 can include MostFreqKDistance, fuzzy similarity, and the Wagner-Fischer algorithm.

In an example of a similarity algorithm, operation 200 may include determining a similarity metric for the string 104 and a historical string. For example, a similarity metric may be the edit distance between the first string 104 and a historical string. Edit distance is a measure of the number of steps it takes to eliminate the difference between two strings. One example of an edit distance is the Levenshtein distance, which takes into account possible substitutions, deletions, and insertions of characters. For instance, the two strings, candle and candy, may have a Levenshtein distance of 2. This number is arrived at because eliminating the difference between these strings could be done in two operations. In one operation, candle is converted to candle by deletion of one character, e. The second operation converts candl to candy by replacing l with y. These two strings would be considered more similar than two strings with a Levenshtein distance of 3 between them. An example of two strings with a Levenshtein distance of 3 is candle and apple. In one of the three operations, c can be deleted from candle to make andle. In two more operations, n and d would each be substituted with p to arrive at apple. In the case of two strings such as candle and kandle, the Levenshtein distance would be 1.

Levenshtein distance is an example of an edit distance that can be involved in similarity determining algorithms. It can be calculated using the Wagner-Fischer algorithm, though other computational methods can be used. Additionally, there are other types of edit distances that can be used as a similarity metric. One example is the most frequent k similarity, which can be found with the MostFreqKDistance algorithm. Here, an edit distance between a first and second hash value is determined. The hash values can be based on the respective k characters of a selected string 104 and a string from the set of historical strings 428. Another computational method that can determine whether a historical string approximately matches a selected string 104 is fuzzy similarity. Algorithms such as these may be used to determine which selected strings 104 bear enough similarity to confidential historical strings to be treated as confidential themselves.

By setting a similarity threshold, such as a minimum edit distance, it can be determined which strings of input plain text are similar enough to confidential historical strings to be obfuscated. In the example discussed above, a similarity threshold, e.g. a minimum edit distance might be 1. In some embodiments, a similarity threshold could be set by a user. In other embodiments, a similarity threshold may be set automatically based on an analysis of historical data, e.g. similarity thresholds previously set by a user. Returning to an example discussed above, if candle were the string from the set of historical strings, the input plain text string kandle, which has a similarity metric of 1, would be obfuscated. However, candy and apple, with their respective edit distances of 2 and 3, would be displayed without obfuscation.

If the selected string 104 is found to be similar, e.g., within a similarity threshold, to a string in the set of new and historical strings 428, a text signature that matches that historical string is updated in operation 202. The updated text signature is saved to a confidential data format repository 426 in operation 210. If no similar strings are found in operation 200, it may be inferred that the selected string does not require obfuscation and the selected string may be displayed without obfuscation in operation 212. In some embodiments, a selected string that is not obfuscated may be deleted from the set of new and historical strings 428 in operation 212. Deleting a string found to not require obfuscation from the set 428 may prevent the process 98 from adaptively, and incorrectly, learning that a particular non-confidential string is to be obfuscated. The updated text signature generated in operation 202 defines a search pattern that matches the selected string and the identified similar historical string. For example, assume the string 104 is the string "rat." In operation 200, it is determined that the string "rat" is similar to historical strings "bat" and "cat," e.g. the similarity metric is within the similarity threshold. In operation 202, the text signature that matches the historical strings "bat" and "cat" can be updated so that it also matches the string "rat."

The selected string 104 may have a different length than the strings in the set of historical strings. For example, assume the string 104 is "1111-2222-3333-444" (15 characters). In operation 200, it is determined that this string is similar to the historical string, "1111-2222-3333-4444" (16 characters). The predefined text signature that matches the historical string can then be updated so that it matches strings "1111-2222-3333-4444" and "1111-2222-3333-444." Here, the updated text signature defines a search pattern that includes the string lengths of both the selected string 104 and the historical string.

In the first example above, wherein the selected string 104 "rat" was determined to be similar to the strings "cat" and "bat," a predefined text signature [bc]at may be used as designed to locate the two historical strings. In operation 202, a new text signature of the form [bcr]at may be generated. The new text signature may be generated by updating a text signature in the set of two or more predefined text signatures that matches the identified historical strings, e.g. [bc]at. The updated text signature [bcr]at correctly identifies historical strings "bat" and "cat" as well as the new string "rat." The updated text signature defines a pattern that matches the "new" characters in the selected string as well as the characters in the historical string. In the second example above, the predefined text signature can be "dddd-dddd-dddd-dddd." The new text signature can be "dddd-dddd-dddd-ddd?." In this example, the metacharacter "?" may specify a character that matches the preceding character zero or one times.

In operation 203, the obfuscation key corresponding to the predefined text signature is updated so that it corresponds to the updated text signature. It is also saved to a set of obfuscation keys 427 in a computer memory 404. In various embodiments, the string 104 is then obfuscated in operation 204 with the obfuscation key corresponding to its matching text signature. In the example involving strings of different lengths, supra, the predefined obfuscation key could transform the historical string "1111-2222-3333-4444" into "XXXX-XXXX-XXXX-XXXX." In this case, the new string "1111-2222-3333-444" might become "XXXX-XXXX-XXXX-XXX."

Also depicted in FIG. 2 is the optional use of a frequent itemset matching algorithm in operation 206 to determine whether an associated-string condition is true for a selected string 104, according to some embodiments of process 98. This can improve the accuracy of identifying a string to be obfuscated by taking context into account. An associated-string condition could be that two or more strings may be considered associated with one another if they appear together as an itemset with a frequency above some threshold. In operation 206, it can be determined whether a selected string 104 is associated with one or more strings that have a constant value in at least two of two or more portions of input plain text 100. If it is, an associated-string condition can be generated in operation 208 wherein a selected string 104 must meet this condition in order to be obfuscated. In operation 210, this condition can be saved with the text signature for the selected string 104 in a confidential data format repository 426 in a computer memory 404. In addition, in embodiments in which frequent itemset matching is employed, obfuscation of a string (operation 204) may be deferred until after it is determined whether an associated string condition is satisfied.

An example of this is in the case of an unstructured plain text document that contains account numbers, which are considered confidential. Here, a predefined text signature is designed to detect 10-digit account numbers, e.g. to match strings of 10-digit numbers. When the unstructured plain text document is analyzed in process 98, a selected string 104 could be a 10-digit number. In operation 108, this string would be found to match the predefined text signature that matches 10-digit numbers. In operation 206, a frequent itemset matching algorithm would determine whether there are strings with which the 10-digit string 104 is associated with a frequency above a certain threshold. In this example, it could be that the 10-digit number is associated with the string "account number." This being the case, in some embodiments, an associated-string condition could be generated in operation 208, wherein a particular portion of input plain text containing a 10-digit number (a first string) must also include the string "account number" (a second string) in order to be considered confidential. In various portions of input plain text, the string "account number" has the same value, i.e. a "constant value." The associated-string condition could be saved to a confidential data format repository 426 in operation 210. In various other embodiments, e.g. after an associated-string condition has been generated, it may be determined in operation 206 whether an associated-string condition is true. Still referring to the 10-digit string that matches a predefined signature, if an associated-string condition is determined to be true for the 10-digit string 104, string obfuscation operation 204 may be deferred so that it is performed subsequent to or as part of operation 206.

Continuing this account number example, another selected string 104 of input plain text may be a 9-digit number. This string wouldn't match the predefined text signature designed to locate 10-digit numbers and, in this example, would not be found to match any other predefined text signatures in operation 108. However, in operation 200, a similarity algorithm could determine that the selected 9-digit string is similar enough to a 10-digit account number that it should be considered confidential. In some embodiments, obfuscation (operation 204) of this string may be deferred until it could be analyzed by a frequent itemset matching algorithm in operation 206. It may be found that the 9-digit number appears as an itemset with the constant string "account number." If the 9-digit number string appears as an itemset with the string "account number" with a frequency above some threshold, the two strings could be considered associated. In response to this determination, in some embodiments, an associated-string condition could be generated wherein 9- and 10-digit numbers are considered confidential only if the string "account number" is also included in the same portion of input text. This condition could then be saved to a confidential data format repository 426 stored in a computer memory 404. In various other embodiments, e.g., after an associated-string condition has been generated, if an associated-string condition is determined to be true for the 9-digit string 104, string obfuscation operation 204 may be deferred so that it is performed subsequent to or as part of operation 206. Use of an associated-string condition may provide greater accuracy in locating future 9- and 10-digit numbers that should be obfuscated. After this condition is generated and saved, future 9- and 10-digit number that do not appear with the string "account" number would not be obfuscated.

An example of a frequent itemset matching algorithm that could be used to carry out operation 206 is the Apriori algorithm. This algorithm generates association rules by determining how often strings appear together as itemsets. If two strings are detected as an itemset with a frequency above some threshold, they may be considered to be associated with one another. During operation 206, the Apriori algorithm could locate one or more strings associated with a selected string 104 that was found to match a text signature from the set of predefined text signatures in operation 108. It could also locate one or more strings associated with a selected string 104 found in operation 200 to be similar to a historical string that matched a predefined text signature from the set. Operation 206 may use the set of new and historical strings 428 stored in memory 404 in making a determination as to whether two strings appear as an itemset with a frequency above a threshold. In operation 208, an associated-string condition can be generated stating that the strings located by the Apriori algorithm are considered associated with one another. In operation 210, this condition may be saved to a confidential data format repository 426.

In various embodiments, an associated-string condition can be generated by evaluating two or more portions of input plain text. For each of these portions of input plain text, it can be determined whether a selected string and a second string appear in the same portion of input plain text. In this determination, the "selected string" is the string matching a newly generated or pre-existing text signature. Stated differently, there is a newly generated or pre-existing text signature defining a pattern that includes the selected string. In addition, the "second string" is a particular string having a "constant" value, such as "account number." By making this determination for multiple portions of input plain text, a frequency of occurrence can be calculated. As the number of portions of input plain text containing both the selected string and the second string increases, greater or less confidence can be given to an associated-string condition. Generally, at least two of the two or more portions of input plain text should be evaluated. The frequency of occurrence may be compared to a frequency threshold. If a quantity or number of portions of input plain text are found to contain both the selected string and the second string, and this quantity or number occurs with a frequency that is at a frequency threshold, an associated-string condition can be deemed valid. For example, a frequency threshold may be 90% and an evaluation of two or more portions of input plain text may indicate that 95% of the portions contain both the selected string and the second string. As 95% is greater than the frequency threshold of 90%, an associated-string condition can be deemed valid. If a frequency of occurrence is less than a frequency threshold, an associated-string condition may not be generated. Continuing this example, 89% of the portions of input plain text could be found to contain the selected string and the second string. In this case, the frequency of occurrence is less than the frequency threshold of 90%, and an associated-string condition would not be generated. If the frequency of occurrence were at the frequency threshold, 90% in this example, an associated-string condition may or may not be generated.

It will be appreciated that the frequent itemset matching algorithm of operation 206 may "learn" as new instances of plain text 100 are received and its parsed strings 104 are added to the set of new and historical strings 428. For example, the operation 206 may determine that string A and string B are not associated with one another because they only appear together one time. However, after additional new instances of plain text 100 are received, the operation 206 may determine that string A and string B are associated with one another because they appear together a number of times greater than a threshold, e.g., five.

Referring now to FIG. 4, shown is a high-level block diagram of an example computer system 400 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more CPUs 402, a memory subsystem 404, a terminal interface 412, a storage interface 416, an I/O (input/output) device interface 414, and a network interface 418, all of which may be communicatively coupled, directly or indirectly, for inter-component communication via a memory bus 403, an I/O bus 408, bus interface unit 407, and an I/O bus interface unit 410.

The computer system 400 may contain one or more general-purpose programmable central processing units (CPUs) 402A, 402B, and 402C, herein generically referred to as the CPU 402. In some embodiments, the computer system 400 may contain multiple processors typical of a relatively large system; however, in other embodiments the computer system 400 may alternatively be a single CPU system. Each CPU 402 may execute instructions stored in the memory subsystem 404 and may include one or more levels of on-board cache.

In an embodiment, the memory 404 may include a random-access semiconductor memory, storage device, or storage medium (either volatile or non-volatile) for storing or encoding data and programs. In another embodiment, the memory 404 represents the entire virtual memory of the computer system 400, and may also include the virtual memory of other computer systems coupled to the computer system 400 or connected via a network. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the following: a similarity determining module 422, a frequent itemset matching module 424, a confidential data format repository 426, a set of obfuscation keys 427, and a set of new and historical strings 428. These components are illustrated as being included within the memory 404 in the computer system 400. However, in other embodiments, some or all of them may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the similarity determining module 422, the frequent itemset matching module 424, the confidential data format repository 426, a set of obfuscation keys 427, and the set of new and historical strings 428 are illustrated as being included within the memory 404, these components are not necessarily all completely contained in the same storage device at the same time. Further, although the similarity determining module 422, the frequent itemset matching module 424, the confidential data format repository 426, a set of obfuscation keys 427, and the set of new and historical strings 428 are illustrated as being separate entities, in other embodiments some of them, portions of some of them, or all of them may be packaged together.

In an embodiment, the similarity determining module 422, the frequent itemset matching module 424, the confidential data format repository 426, a set of obfuscation keys 427, and the set of new and historical strings 428 may include instructions or statements that execute on the processor 402 or instructions or statements that are interpreted by instructions or statements that execute on the processor 402 to carry out the functions as further described in this disclosure. In another embodiment, the similarity determining module 422, the frequent itemset matching module 424, the confidential data format repository 426, a set of obfuscation keys 427, and the set of new and historical strings 428 are implemented in hardware via semiconductor devices, chips, logical gates, circuits, circuit cards, and/or other physical hardware devices in lieu of, or in addition to, a processor-based system. In another embodiment, the similarity determining module 422, the frequent itemset matching module 424, the confidential data format repository 426, a set of obfuscation keys 427, and the set of new and historical strings 428 may include data in addition to instructions or statements.

The similarity determining module 422 may include processes for determining the similarity between a string of input plain text and a string of confidential information. The similarity determining module 422 may include one or more of the operations of process 98, e.g. operations 102-116 and 200-204, and 212. The frequent itemset matching module 424 may include processes for locating strings that are associated with a selected string of input plain text. The frequent itemset matching module 424 may include one or more of the operations of process 98, e.g. operations 204-210. The confidential data format repository 426 may contain common and specific samples of confidential data formats and patterns, including text signatures and associated-string conditions, as well as confidential data provided by a third party. The set of obfuscation keys 427 may contain predefined obfuscation keys designed to match predefined confidential data formats and patterns. It may also contain obfuscation keys that have been updated to match newly generated confidential data formats and patterns. The set of new and historical strings 428 can include historical strings of information that is known to be confidential. It also may include selected strings of input plain text that may or may not be confidential.

Although the memory bus 403 is shown in FIG. 4 as a single bus structure providing a direct communication path among the CPUs 402, the memory subsystem 404, the display system 406, the bus interface 407, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

The computer system 400 may include a bus interface unit 407 to handle communications among the processor 402, the memory 404, a display system 406, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 may be a multi-user mainframe computer system, a single-user system, or a server computer or similar device that has little or no direct user interface, but receives requests from other computer systems (clients). Further, in some embodiments, the computer system 400 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:
   parsing, by a processor, input plain text into one or more strings;
   comparing, by the processor, a first string of a first portion of the input plain text to text signatures in a confidential data format repository stored in a memory, wherein the text signatures correspond to confidential data patterns, and wherein the text signatures correspond to obfuscation keys in a set of obfuscation keys;
   determining, by the processor, that the first string does not match any of the text signatures;
   determining, by the processor, a similarity metric value for the first string and at least one historical string from a set of historical strings stored in the memory, wherein the at least one historical string matches a text signature from the text signatures;
   determining, by the processor, that the similarity metric value is within a similarity threshold;
   in response to the determining that the similarity metric value is within the similarity threshold, updating, by the processor, the text signature matching the at least one historical string to generate an updated text signature, wherein the updated text signature defines a pattern that includes the first string and the at least one historical string;
   saving the updated text signature, by the processor, to the confidential data format repository;
   updating, by the processor, an obfuscation key that corresponds to the text signature matching the at least one historical string to generate an updated obfuscation key corresponding to the updated text signature; and
   saving, by the processor, the updated obfuscation key to the set of obfuscation keys.

2. The method of claim 1, further comprising obfuscating, by the processor, the first string with the updated obfuscation key.

3. The method of claim 1, further comprising:
   determining, by the processor, whether an associated-string condition is true for the first string, the associated-string condition being that a second string appears in the first portion of input plain text, the second string being a particular string determined to be associated with the at least one historical string; and
   in response to determining that the associated-string condition is true, obfuscating, by the processor, the first string with the updated obfuscation key.

4. The method of claim 1, further comprising generating an associated-string condition by:
   determining for the input plain text, by the processor, a frequency of occurrence of the first string and a second string as an itemset, the second string being a particular string having a constant value in at least two portions of the input plain text; and
   determining, by the processor, that the first string is associated with the second string when the frequency of occurrence of the itemset is at or above a frequency threshold.

5. The method of claim 1, wherein the determining the similarity metric value for the first string and the at least one historical string includes:
   determining first and second hash values based on t-most frequent k characters, respectively, for the first string and the at least one historical string; and
   determining a string distance between the first and second hash values.

6. The method of claim 1, wherein the determining the similarity metric value for the first string and the at least one historical string includes determining an edit distance between the at least one historical string and the first string.

7. The method of claim 1, further comprising
   comparing, by the processor, a second string of the first portion of the input plain text to the text signatures in the confidential data format repository;
   determining, by the processor, that the second string matches the updated text signature; and
   in response to the determining that the second string matches the updated text signature, obfuscating the second string with the updated obfuscation key.

8. A system comprising:
   a memory;
   a processor;
   a confidential data format repository comprising:
      a set of text signatures; and
      a set of obfuscation keys corresponding to the text signatures; and
   a similarity determining module configured to:
      parse input plain text into one or more strings;
      compare a first string of a first portion of the input plain text to text signatures from the set of text signatures;

determine that the first string does not match any of the text signatures;

determine a similarity metric value for the first string and at least one historical string from a set of historical strings stored in the memory, wherein the at least one historical string matches a text signature from the set of text signatures;

determine that the similarity metric value is within a similarity threshold;

in response to the determining that the similarity metric value is within the similarity threshold, update the text signature matching the at least one historical string to generate an updated text signature, wherein the updated signature defines a pattern that includes the first string and the at least one historical string;

save the updated text signature to the set of text signatures;

update an obfuscation key that corresponds to the text signature matching the at least one historical string to generate an updated obfuscation key corresponding to the updated text signature; and save the updated obfuscation key to the set of obfuscation keys.

9. The system of claim 8, wherein the similarity determining module is further configured to obfuscate the first string with the updated obfuscation key.

10. The system of claim 8, wherein the similarity determining module is further configured to:

determine whether an associated-string condition is true for the first string, the associated-string condition being that a second string appears in the first portion of input plain text, the second string being a particular string determined to be associated with the at least one historical string; and in response to determining that the associated-string condition is true, obfuscate the first string with the updated obfuscation key.

11. The system of claim 8, further comprising a frequent itemset matching module configured to generate an associated-string condition by:

determining, for the input plain text, a frequency of occurrence of the first string and a second string as an itemset, the second string being a particular string having a constant value in at least two portions of the input plain text; and determining that the first string is associated with the second string when the frequency of occurrence of the itemset is at or above a frequency threshold.

12. The system of claim 8, wherein the determining the similarity metric value for the first string and the at least one historical string includes:

determining first and second hash values based on a-most frequent k characters, respectively, for the first string and the at least one historical string; and determining a string distance between the first and second hash values.

13. The system of claim 8, wherein the determining the similarity metric value for the first string and the at least one historical string includes determining an edit distance between the at least one historical string and the first string.

14. The system of claim 8, wherein the determining the similarity metric value for the first string and the at least one historical string includes determining that the at least one historical string approximately matches the first string.

15. A computer program product for obfuscating a string, the computer program product comprising a computer readable storage medium having program instructions embodied therewith, wherein the computer readable storage medium is not a transitory system per se, the program instructions executable by a processor to cause the device to perform a method comprising:

parsing, by the processor, input plain text into one or more strings;

comparing, by the processor, a first string of a first portion of input plain text to text signatures in a confidential data format repository, wherein the text signatures correspond to confidential data patterns, and wherein the text signatures correspond to obfuscation keys in a set of obfuscation keys;

determining, by the processor, that the first string does not match any of the text signatures;

determining, by the processor, a similarity metric value for the first string and at least one historical string from a set of historical strings stored in the memory, wherein the at least one historical string matches a text signature from the text signatures in the confidential data format repository;

determining, by the processor, that the similarity metric value is within a similarity threshold;

in response to the determining that the similarity metric value is within the similarity threshold, updating, by the processor, the text signature matching the at least one historical string to generate an updated text signature, wherein the updated text signature defines a pattern that includes the first string and the at least one historical string;

saving the updated text signature, by the processor, to the confidential data format repository;

updating, by the processor, an obfuscation key that corresponds to the text signature matching the at least one historical string to generate an updated obfuscation key corresponding to the updated text signature; and saving, by the processor, the updated obfuscation key to the set of obfuscation keys.

16. The computer program product of claim 15, further comprising obfuscating, by the processor, the first string with the updated obfuscation key.

17. The computer program product of claim 15, further comprising:

determining, by the processor, whether an associated-string condition is true for the first string, the associated-string condition being that a second string appears in the first portion of input plain text, the second string being a particular string determined to be associated with the at least one historical string; and in response to determining that the associated-string condition is true, obfuscating, by the processor, the first string with the updated obfuscation key.

18. The computer program product of claim 15, further comprising generating an associated-string condition by:

determining for the input plain text, by the processor, a frequency of occurrence of the first string and a second string as an itemset, the second string being a particular string having a constant value in at least two portions of the input plain text; and determining, by the processor, that the first string is associated with the second string when the frequency of occurrence of the itemset is at or above a frequency threshold.

19. The computer program product of claim 15, wherein the determining the similarity metric value for the first string and the at least one historical string includes:

determining first and second hash values based on most frequent k characters, respectively, for the first string and the at least one historical string; and determining a string distance between the first and second hash values.

20. The computer program product of claim 15, wherein the determining the similarity metric value for the first string and the at least one historical string includes determining an edit distance between the at least one historical string and the first string.

* * * * *